Patented July 28, 1953

2,647,075

UNITED STATES PATENT OFFICE 2,647,075

CATALYTIC CRACKING OF PETROLEUM HYDROCARBONS WITH A CLAY TREATED CATALYST

John Norman Haresnape and Frederick William Bertram Porter, Sunbury-on-Thames, England, assignors to Anglo-Iranian Oil Company Limited, London, England, a British joint-stock corporation No Drawing. Application January 8, 1948, Serial No. 1,273. In Great Britain January 10, 1947

4 Claims. (Cl. 196—52)

This invention relates to the catalytic cracking of petroleum hydrocarbons.

The catalytic cracking of higher boiling petroleum fractions for the production of gasoline and gas-oil is well known, and catalysts commonly employed for such cracking operations include artificially prepared mixed silica-alumina gel, either in the form of granules or pellets, or, as in the fluid catalytic cracking process, in the form of a fine powder, and the so-called "natural" catalyst being usually a montmorillonite clay of fairly high purity which has been leached with mineral acid to enhance its catalytic activity. The process can be applied to feedstocks of varying sulphur content but the treatment of feedstocks with a high sulphur content suffers from the following disadvantages.

1. The useful life of the catalyst as an agent for catalytic cracking may be considerably shortened.
2. The gasoline and gas-oil products have a comparatively high sulphur content which may be objectionable when the products are used.
3. There is a large make of hydrogen sulphide gas which, in the presence of the steam used in the process, may lead to severe corrosion of the plant.

Normally, in a crude-oil the sulphur content increases with the boiling range, and therefore, the above disadvantages are more pronounced when the higher boiling feedstocks are being catalytically cracked. In very sulphurous feedstocks they may become so great as to render the process inapplicable.

The desulphurisation of sulphur-containing hydrocarbon fractions can be effected by treating such fraction with hydrogen, or gas mixtures rich in hydrogen, at elevated temperature and pressure and in the presence of a sulphur-resistant hydrogenation catalyst, but such treatment involves the use of considerable quantities of hydrogen which may not always be conveniently available in the refinery.

A process has now been evolved by which higher boiling petroleum fractions of high sulphur content may be converted into lower boiling products of low sulphur content, without the use of hydrogen or gas mixtures rich in hydrogen other than those produced in the process.

The process according to the present invention comprises catalytically cracking a petroleum feedstock boiling in the gas-oil range or higher, separating from the products of the cracking operation a gaseous fraction rich in hydrogen, and passing the gaseous fraction, if desired after further treatment to increase its content of hydrogen, together with the feedstock to a desulphurisation zone maintained under elevated temperature and pressure, wherein the feedstock is treated in the presence of a sulphur-resistant hydrogenation catalyst to convert the sulphur compounds present in the feedstock into hydrogen sulphide, separating the hydrogen sulphide from the treated feedstock and thereafter passing the treated feedstock to the cracking zone.

It is a preferred feature of the invention that the cracking operation be carried out in the presence of a catalyst having high hydrogen-producing activity and comprising montmorillonite from which at least part of the combined hydroxyl groups have been removed. However it has been found that provided the sulphur content of the feedstock is not too high, it is possible to carry out the process using a synthetic silica-alumina catalyst or a montmorillonite catalyst of the usual kind, but in such a case the hydrogen content of the cracked gas may be only just sufficient for the desulphurisation step and moreover the gas may require considerable processing to remove constituents other than hydrogen and so raise the hydrogen concentration to the practicable minimum for the desulphurisation step. On the other hand, when using a cracking catalyst consisting of a dehydrated montmorillonite the hydrogen content of the cracked gas is sufficiently large to enable the gas to be used in the desulphurisation step without further treatment and, moreover, the exit gas from the desulphurisation zone is still sufficiently rich in hydrogen to be used, if desired after treatment to increase the hydrogen concentration, for other hydrogenation processes, such as the desulphurisation of other hydrocarbon fractions.

Montmorillonite may be represented by the approximate formula $Al_2O_3.H_2O.4SiO_2.xH_2O$, with the $Al_2O_3$ partially replaced by iron oxide, magnesium oxide, sodium oxide and the like. A more accurate formula is $Al_2Si_4O_{10}(OH)_2.xH_2O$, with the aluminium atoms partially replaced by other atoms such as iron, magnesium and sodium. The effect of heating is first to eliminate the $x$ molecules of water at a temperature of 100–200° C., and thereafter the combined hydroxyl groups at a much higher temperature. We have found that the temperature which it is necessary to heat the clay to initiate the loss of the combined hydroxyl groups lies within the range 500–700° C. depending upon the content of certain impurities, notably iron and sodium. For example, montmorillonites having a high content of iron and/or sodium dehydrate near the lower limit of this range, while those having a low content of iron and/or sodium dehydrate near the upper limit of the range. As a general rule, those montmorillonites having more than 7% iron oxide will be substantially completely dehydrated at temperatures around 500° C., while those with less than 1.5% iron oxide, only at temperatures approaching 700° C.

The combined hydroxyl groups may be removed from a part or all of the catalyst, since the dehydrogenation type of activity begins to appear as soon as the loss of the combined hydroxyl groups commences. In practice, it is improbable that the mineral is completely dehydrated in heating to the determined temperature.

The activity of the catalysts used according to the present invention as dehydrogenation catalysts tends to decline if they become rehydrated either prior to use as a catalyst, or at some stage in the catalytic cracking process, as for instance by exposure to steam at high temperature. According to a further feature of the invention, such decline may be prevented or reduced by use of the catalyst, which has been treated, while in the dehydrated state, with hydrogen sulphide at a temperature of about 850° F. It is possible that the hydrogen sulphide molecules enter into the structure of the montmorillonite in substitution for the water removed on dehydration. The necessary treatment with hydrogen sulphide may be effected by using the dehydrated catalyst, before it has had an opportunity of becoming rehydrated, to crack a feedstock containing sulphur whereby hydrogen sulphide is liberated as the cracking reaction proceeds. On the other hand, the dehydrated catalyst may be treated with hydrogen sulphide in a separate operation prior to being used as a cracking catalyst.

We have also found that an acid treated montmorillonite catalyst of low iron content, which had lost a large part of its activity for catalytic cracking, may be converted into a stable catalyst for use according to the present invention simply by heating to a temperature sufficient to dehydrate the catalyst completely. Such application of the invention is of particular advantage inasmuch as spent montmorillonite cracking catalysts, which would normally be discarded, may be converted into valuable catalysts according to the present invention.

Thus, one example of a catalyst for use according to the invention is a fuller's earth, having the analysis (a) in Table 1 below, which, after acid treatment had the analysis (b) as set out in Table 1. This material requires heating to 500° C. only, for dehydration to take place and the desired type of activity to be developed. Another example is a bentonite (consisting essentially of montmorillonite) having the analysis (c) as set out in Table 1 which after acid treatment had the analysis (d) as set out in Table 1. This material requires heating to a temperature of 650°–700° C. before developing the desired type of activity.

TABLE 1

| Constituent | | a | b | c | d |
|---|---|---|---|---|---|
| $SiO_2$ | Percent Wt | 61.0 | 64.7 | 50.5 | 50.2 |
| $Al_2O_3$ | do | 14.9 | 11.7 | 17.0 | 8.2 |
| $Fe_2O_3+FeO$ | do | 8.2 | 5.6 | 1.1 | 0.4 |
| CaO | do | 2.4 | 4.1 | 4.2 | 1.9 |
| MgO | do | 3.8 | 3.9 | 5.4 | 0.9 |
| $H_2O$ | do | 5.9 | 5.3 | 23.8 | 35.5 |

Using a catalyst as hereinbefore defined and with equal conversion of the feedstock to lower boiling products, the make of gas may be more than doubled in volume, the whole of the increase being represented by an increase in the amount of hydrogen produced. Thus, by cracking a wax distillate, boiling in the range 650°–900° F., and representing the portion obtained between 69.6 and 79.0% wt. in the fractional distillation of Iranian crude oil, on a synthetic silica-alumina catalyst or on a natural catalyst which is not dehydrated, the product which is gaseous at —40° C. contains less than 25% hydrogen, whereas by cracking the same wax distillate on the dehydrated catalyst according to the invention, the gaseous product contains more than 40% hydrogen under a wide variety of conditions and may contain as much as 80% hydrogen; and whereas on the former catalysts, the hydrogen produced does not exceed 150 cu. ft./bbl. of feedstock processed, on the dehydrated catalyst according to the invention it may be as high as 680 cu. ft./bbl. In a similar conversion of feedstock to lower boiling products, the conversion to gasoline is rather lower, and that to gas-oil rather higher, when using the dehydrated catalyst according to the invention.

In the process of the invention the gasoline contains a larger proportion of the less volatile components and the decrease is almost entirely confined to the fractions boiling below 100° C. This may be an advantage in any refinery where the more volatile hydrocarbons are in excess of requirements for balanced production. The octane number of the gasoline and the quality of the gas-oil are similar to those of the products obtained on undehydrated natural catalysts. Under comparable conditions of temperature, contact time and the like, the conversion of feedstock to lower boiling hydrocarbons is rather less than on a synthetic silica-alumina catalyst or on an undehydrated natural clay catalyst, but this can be compensated for in a continuous unit by operating both the reaction and regeneration steps at a higher temperature, since with the type of catalyst used according to the invention it is not necessary to limit so severely the maximum temperature to which it is subjected, in order to prevent decrease in the activity of the catalyst.

The analysis of three typical gas mixtures (a), (b) and (c) obtained by the cracking of the above defined wax distillate in accordance with the process of the invention are given in Table 2 below.

TABLE 2

| Constituent | a | b | c |
|---|---|---|---|
| $H_2$ | 63.0 | 70.0 | 77.1 |
| $CH_4$ | 13.0 | 9.3 | 7.2 |
| $C_2H_4$ | 4.3 | 3.6 | 1.9 |
| $C_2H_6$ | 7.1 | 5.3 | 3.7 |
| $C_3H_6$ | 3.9 | 2.9 | 2.4 |
| $C_3H_8$ | 3.2 | 2.9 | 2.2 |
| $C_4H_8$ | 2.1 | } 3.9 | 3.1 |
| $C_4H_{10}$ | 1.2 | | |
| $C_5+$ | 1.8 | 1.5 | 1.8 |
| $H_2S$ | 0.4 | 0.6 | 0.6 |

For many purposes these gases are sufficiently rich in hydrogen for use as produced, but may be further purified by any known method.

The desulphurisation catalyst may be any of the known sulphur resistant hydrogenating catalysts such as the oxides and sulphides of iron, nickel, cobalt, chromium, molybdenum, copper, manganese and tungsten, metals such as sodium, potassium, lithium, calcium, zinc, aluminium, manganese, iron, nickel, cobalt or copper, or compounds such as molybdates, thiomolybdates, thiotungstates, or aluminates of metals of the 6th group either alone or in combination with other catalysts, but a catalyst consisting of cobalt molybdate deposited on activated alumina is preferred. When using this catalyst we prefer to operate at a pressure in the range 500–1500 p. s. i. g. and at a temperature of 720°–800° F. The catalytic cracking stage may be accomplished in any of the known types of plant employing, for example, a fixed catalyst bed periodically regenerated in situ by discontinuing the feed and passing air or diluted air over the catalyst, or alternatively, a continuously operated fluid bed with circulation of catalyst between reactor and regenerator.

The following is an example of the process of the invention carried out with the use of a fixed catalyst bed.

*Example*

The feedstock is a waxy distillate representing the portion obtained between 68.6 and 79.0% wt. in a distillation of an Iranian crude oil. It has 20% by volume distilling below 770° F., a specific gravity at 140° F. of 0.8770 and a sulphur content of 1.50% wt. The gas produced in the cracking stage, described below, amounts to 600 cu. ft. (measured at 60° F. and atmospheric pressure) per barrel of feedstock and has the following analysis:

| | Mol. per cent |
|---|---|
| $H_2$ | 67.1 |
| $CH_4$ | 11.4 |
| $C_2H_4$ | 1.5 |
| $C_2H_6$ | 7.0 |
| $C_3H_6$ | 4.0 |
| $C_3H_8$ | 3.6 |
| $C_4$ Hydrocarbons | 4.3 |
| $C_5$ Hydrocarbons | 1.1 |

This gas is compressed to 1000 p. s. i. g. and is then passed with the feedstock (at the rate of 590 cu. ft. of gas, measured at 60° F. and atmospheric pressure, per barrel of feedstock) through a heat exchanger and then through a preheater to a reactor containing a desulphurisation catalyst which preferably consists of 10% of cobalt molybdate deposited on activated alumina, and maintained at 750° F. and 1000 p. s. i. g. The throughput through the reactor amounts to 1 litre of feedstock per litre of catalyst per hour. The products from the reactor are passed to a separator maintained at approximately 38 p. s. i. g. and 550° F. where a separation into a liquid and a gaseous product occurs. The liquid product amounts to 98.3% wt. on feed, is substantially free from dissolved $H_2S$ and contains 0.12% of combined sulphur. The desulphurised feedstock is vapourised and passed at atmospheric pressure to a catalytic cracking reactor maintained at 850° F., wherein the feedstock is contacted with a cracking catalyst of the dehydrated montmorillonite type the catalyst being in pellet form. The vapourised feedstock is fed to the reactor at a rate equivalent to 0.6 volumes of liquid feedstock per volume of catalyst per hour. After two hours on charge, the catalyst is regenerated by passing a mixture of air and flue gas over it for one hour, after which the processing of the feedstock is continued.

The products of the cracking operation are cooled and then separated at 60° F. into a liquid product and a gaseous product. The liquid product is separated by distillation into a gasoline fraction of boiling range up to 430° F. and constituting 17.6% wt. on feed, a gas-oil of boiling range 430–740° F. constituting 24.8% wt. on feed, and a residue boiling above 740° F., constituting 42.5% wt. on feed. The gaseous product is scrubbed for recovery of butanes, pentanes and the like, and then constitutes 6.9% on feed, and has the analysis quoted above. The recovered light hydrocarbons amount to 2.5% on feed and the carbon deposited on the catalyst is 4% on feed. The gasoline has a sulphur content of less than 0.01% wt. and the gas-oil a sulphur content of less than 0.10% wt. The gas leaving the separator to which the feedstock passes from the desulphurisation reactor and containing unused hydrogen, $H_2S$ and light hydrocarbons formed in the desulphurisation step is cooled and passed to a further separator, wherein the higher boiling hydrocarbons are removed, and thence to a scrubber wherein $H_2S$ and further hydrocarbons are removed so that the exit gas is free from $H_2S$ and has approximately the same analysis as the input gas given above.

The exit gas from the desulphurisation stage may be used for other hydrogenation processes, or may conveniently be recycled to the desulphurisation stage whereby the gas rate to the desulphurisation stage may be increased to 4000 cu. ft. (measured at 60° F. and atmospheric pressure) per barrel of feedstock, the operating temperature of the desulphurisation reactor being raised to 780° F. Under these conditions, the yield of liquid product separated after the desulphurisation stage amounts to 96.2% wt. on feed, but its sulphur content is only 0.024% wt. The yield of gasoline is increased compared with that given in the example to 25.3% and the sulphur content of the gasoline is 0.002%. The gas-oil yield is virtually unchanged but its sulphur content is 0.02%; the composition of the gas is almost unchanged.

It will thus be seen that the process of the invention enables sulphur-free cracked hydrocarbon products to be obtained from a high boiling feedstock of very high sulphur content without the use of external hydrogen. The process has the additional advantage that nitrogen compounds in the feedstock are reduced during the desulphurisation stage.

It is also an advantage of the process according to the invention that the use of the desulphurisation step prior to the catalytic cracking step results in a considerable increase in the amount of cracking achieved in the cracking step. Thus, if the above mentioned Iranian waxy distillate containing 1.50% wt. of sulphur is cracked under the conditions indicated in the example hereinbefore set forth but omitting the desulphurisation stage, the yields of gasoline and gas-oil are only 17.6 and 24.8% wt. compared with 22.0 and 25.3% wt. on the same feedstock after desulphurisation as in the example.

It is a further advantage of the process according to the invention that the gasoline produced has a higher octane number than that produced by cracking the undesulphurised feedstock. For example, the gasoline obtained by cracking the above-mentioned Iranian waxy distillate had an octane number of 82 as against an octane number of 79 for the gasoline obtained from the undesulphurised feedstock.

We claim:
1. The process which comprises passing a petroleum feedstock boiling in the gas oil range or higher in admixture with hydrogen to a desulphurization zone maintained under elevated temperature and pressure, wherein the feedstock is treated in the presence of a sulphur-resistant hydrogenation catalyst to convert the sulphur compounds present in the feedstock into hydrogen sulphide, separating the hydrogen sulphide from the treated feedstock, passing the desulphurized feedstock to a catalytic cracking zone, wherein the desulphurized feedstock is cracked in the presence of a catalyst consisting essentially of a montmorillonite clay which has been heated to a temperature between about 500° C. and 700° C. to remove substantially completely the combined hydroxyl groups without causing any physical disruption of the clay, and from which clay, as it is employed in the cracking step, the combined hydroxyl groups are substantially completely absent, said temperature being in inverse relationship to the iron oxide content present in said clay such that when the iron oxide content is less than 1.5%, the temperature will be about 700° C., and when the iron oxide content is more than 7%, the temperature will be about 500° C., separating from the products from said catalytic cracking zone a gas mixture rich in hydrogen, and passing said hydrogen-rich gas mixture to said desulphurization zone to constitute the whole of the hydrogen fed to said desulphurization zone.

2. The process of claim 1 in which said montmorillonite clay has an iron oxide content of less than 1.5% by wt. and has been heated to about 700° C. in order to remove at least some of the combined hydroxyl groups therefrom.

3. The process of claim 1 in which said gas mixture contains at least 40% hydrogen amounting to at least 500 cu. ft./bbl. of feedstock.

4. The process of claim 1 in which a gaseous product including the hydrogen sulphide is separated from the treated feedstock and a hydrogen enriched exit gas free of hydrogen sulphide and of approximately the same composition as said hydrogen-rich gas mixture is recovered from said gaseous product, and passing said hydrogen-rich gas mixture together with said exit gas to said desulphurisation zone to constitute the whole of the hydrogen fed to said zone.

JOHN NORMAN HARESNAPE.
FREDERICK WILLIAM BERTRAM PORTER.

References Cited in the file of this patent

UNITED STATES PATENTS

| Number | Name | Date |
|---|---|---|
| 2,242,504 | Benedict et al. | May 20, 1941 |
| 2,271,617 | Benedict | Feb. 3, 1942 |
| 2,289,716 | Marschner | July 14, 1942 |
| 2,291,885 | Egloff | Aug. 4, 1942 |
| 2,355,366 | Conn | Aug. 8, 1944 |
| 2,393,288 | Byrns | Jan. 22, 1946 |
| 2,406,112 | Schulze | Aug. 20, 1946 |
| 2,432,822 | Secor | Dec. 16, 1947 |
| 2,526,700 | Shabaker | Oct. 24, 1950 |

OTHER REFERENCES

Evans, "Oil and Gas Journal," vol. 44, pages 167, 168, 172, 173, 177, 178, 181, 183, March 30, 1946.

Davidson, Petroleum Refiner, vol. 26, No. 9, pages 663–672, September 1947.